(12) United States Patent
Yang

(10) Patent No.: US 11,925,171 B2
(45) Date of Patent: Mar. 12, 2024

(54) CAR SAFETY DEVICE FOR PETS

(71) Applicant: Yung Chuan Yang, Tainan (TW)

(72) Inventor: Yung Chuan Yang, Tainan (TW)

(*) Notice: Subject to any disclaimer, the term of this patent is extended or adjusted under 35 U.S.C. 154(b) by 0 days.

(21) Appl. No.: 17/804,740

(22) Filed: May 31, 2022

(65) Prior Publication Data
US 2023/0082910 A1    Mar. 16, 2023

(30) Foreign Application Priority Data
Sep. 16, 2021 (TW) .................. 110134646

(51) Int. Cl.
*A01K 1/02* (2006.01)
*B60R 22/10* (2006.01)

(52) U.S. Cl.
CPC ............ *A01K 1/0272* (2013.01); *B60R 22/10* (2013.01)

(58) Field of Classification Search
CPC ...... A01K 1/02; A01K 1/0236; A01K 1/0245; A01K 1/0254; A01K 1/0272; A01K 1/0281; B60N 2/2887; B60N 2/289; B60N 2/2893
USPC ...................................................... 297/253
See application file for complete search history.

(56) References Cited

U.S. PATENT DOCUMENTS

| 5,277,148 | A  | * | 1/1994  | Rossignol ............ A01K 1/0245 119/497 |
| 6,681,969 | B1 | * | 1/2004  | Giedeman, III ........ B60R 7/043 297/188.2 |
| 8,091,513 | B1 | * | 1/2012  | Garcia ................. A01K 1/0272 119/28.5 |
| 8,757,099 | B1 | * | 6/2014  | McCarthy ............ A01K 1/0272 119/771 |
| 9,606,845 | B2 | * | 3/2017  | Yang ........................ G06F 9/545 |
| 11,490,588 | B2 | * | 11/2022 | Blood .......................... B62J 9/21 |
| 2005/0284415 | A1 | * | 12/2005 | O'Donnell .............. B60R 22/10 119/771 |
| 2007/0283898 | A1 | * | 12/2007 | Madison ............... A01K 1/0272 119/496 |
| 2008/0156275 | A1 | * | 7/2008  | Lam ...................... A01K 1/0353 119/497 |
| 2008/0184937 | A1 | * | 8/2008  | Hoffman ............... A01K 1/0272 119/28.5 |
| 2009/0199770 | A1 | * | 8/2009  | Jakubowski .......... A01K 1/0272 119/28.5 |

(Continued)

FOREIGN PATENT DOCUMENTS

| KR | 20200053235 | A | * | 11/2018 | ........... A01K 1/0272 |
| KR | 20200091565 | A | * | 1/2019  | ........... A01K 1/0272 |

*Primary Examiner* — Joshua J Michener
*Assistant Examiner* — Nicole Paige Maccrate
(74) *Attorney, Agent, or Firm* — Rosenberg, Klein & Lee

(57) ABSTRACT

A car safety device for pets includes a fixing frame mounted in a seat cushion and a seat cushion cover. The seat cushion with the fixing frame is placed into the seat cushion cover and one end of a support rod of the fixing frame is protruding from the seat cushion cover. While in use, the device is placed on a car seat and an anchor member on the support rod of the fixing frame is connected to a support bar of the car seat. Then a pet carrier bag is disposed on the seat cushion cover and a second connecting member of the pet carrier bag is connected with a first connecting member on the seat cushion cover to fix the pet carrier bag on the present device. Thereby the pet carrier bag is firmly mounted on the car seat and pet safety is improved.

10 Claims, 4 Drawing Sheets

(56) References Cited

U.S. PATENT DOCUMENTS

| | | | | |
|---|---|---|---|---|
| 2010/0018466 | A1* | 1/2010 | Austin | A01K 1/0272 |
| | | | | 119/28.5 |
| 2019/0104702 | A1* | 4/2019 | Edwards | A01K 1/0263 |
| 2019/0313597 | A1* | 10/2019 | Chen | A01K 1/0254 |
| 2019/0380299 | A1* | 12/2019 | Shewfelt | B60R 22/10 |
| 2020/0086823 | A1* | 3/2020 | Koop | A01K 27/002 |
| 2022/0295739 | A1* | 9/2022 | Yoskowitz | A01K 1/0272 |

\* cited by examiner

CAR SAFETY DEVICE FOR PETS

BACKGROUND OF THE INVENTION

Field of the Invention

The present invention relates to a car safety device for pets, especially to a car safety device for pets which allows a pet carrier bag to be fixed firmly on or taken out of a car seat conveniently for improving pet safety in the car.

Description of Related Art

In a society with a declining birthrate and an aging population, more and more people raise pets for company in daily lives to decrease stress and sense of loneliness as well as add fun to life. Some pets' owners even consider pets as a family member and always carry the pets with them while going out.

In order to carry the pets conveniently and prevents the pets from straying and getting lost, pets are often placed in a pet carrier bag. When pet owners take their pets for a car ride, pets move around, without being properly strapped into a restraint may endanger the driver or affect driving safety. Thus most of owners placed their pets in an enclosed pet carrier and arranged the pet carrier at a car seat. However, without being secured and fixed, the pet carrier on the car seat may be shaking, sliding or even coming off from the car seat when the car is hitting a bump or making a turn or braking. Thereby the pets in the pet carrier are scared, shivering, and even injured and the safety of the pet in the car is threatened.

Thus there is a room for improvement and there is a need to provide a car safety device for pets with novel structure for addressing the above issues.

SUMMARY OF THE INVENTION

Therefore, it is a primary object of the present invention to provide a car safety device for pets which allows a pet carrier bag to be fixed on a car seat stably for improvement of pet safety in the car. Moreover, the pet carrier bag can be taken out of the car seat conveniently.

In order to achieve the above objects, a car safety device for pets according to the present invention includes a seat cushion, a fixing frame mounted in the seat cushion, and a seat cushion cover in which the seat cushion with the fixing frame is mounted. A working end of at least one support rod of the fixing frame is protruding from the seat cushion cover and an anchor member is disposed on the working end of the support rod. At least one first connecting member arranged at the seat cushion cover while at least one second connecting member is mounted to a pet carrier bag to be connected or disconnected with the first connecting member correspondingly.

Preferably, the first connecting member is disposed around an upper end of the seat cushion cover while the second connecting member is arranged around a bottom end of the pet carrier bag.

Preferably, the first connecting member of the seat cushion cover and the second connecting member of the pet carrier bag can be zippers, hook-and-loop fasteners, or male and female interlocking elements of a snap fastener.

The seat cushion consists of a pad body and a cover body. The pad body is provided with a mounting slot whose shape is corresponding to the fixing frame and having an opening on a top end of the pad body for allowing the fixing frame to be mounted and positioned in the mounting slot of the pad body through the opening. Moreover, the working end of the support rod of the fixing frame is protruding from the pad body. Then the cover body is covering the top end of the pad body for closing the opening of the mounting slot of the pad body.

The pad body and the cover body of the seat cushion can be made of plastic, polystyrene, rubber, foam materials, or metals.

Preferably, an operating member is mounted to the support rod of the fixing frame and the anchor member on the working end of the support rod is linked with and actuated by the operating member.

Preferably, the fixing frame is provided with two support rods arranged parallel to each other and the working end of each of the two support rods is provided with the anchor member.

The seat cushion cover is composed of a mounting space therein, an opening formed on a part of a periphery thereof, at least one seal member arranged at the opening, at least one through hole disposed on the periphery thereof without the opening and communicating with the mounting space. The seat cushion mounted with the fixing frame is placed into the mounting space of the seat cushion cover and the working ends of the support rods of the fixing frame are protruding from the through holes of the seat cushion cover correspondingly.

Preferably, the seal member of the seat cushion cover can be a zipper, a hook-and-loop fastener, or a snap fastener having male and female interlocking elements.

While in use, the present device is disposed on a car seat and the anchor members on working ends of the support rods of the fixing frame are connected and fixed on a support bar of the car seat. Then the pet carrier bag is placed on the seat cushion cover and the second connecting member around the bottom end of the pet carrier bag is connected with the first connecting member of the seat cushion cover correspondingly to fix the pet carrier bag firmly on the present device. Thereby the pet carrier bag is tightly disposed on the car seat by the present invention to prevent the pet carrier bag from shaking, sliding, or even falling down from the car seat during while driving. Moreover, users only need to separate the pet carrier bag from the present device by disconnecting the second connecting member of the pet carrier bag and the first connecting member of the seat cushion cover when they reach the destination. Thus the pet carrier bag together with pets therein can be taken out of the car conveniently.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

In order to learn technical features and functions of the present invention more completely and clearly, please refer to the following embodiments, related figures and reference signs.

Figure 1:
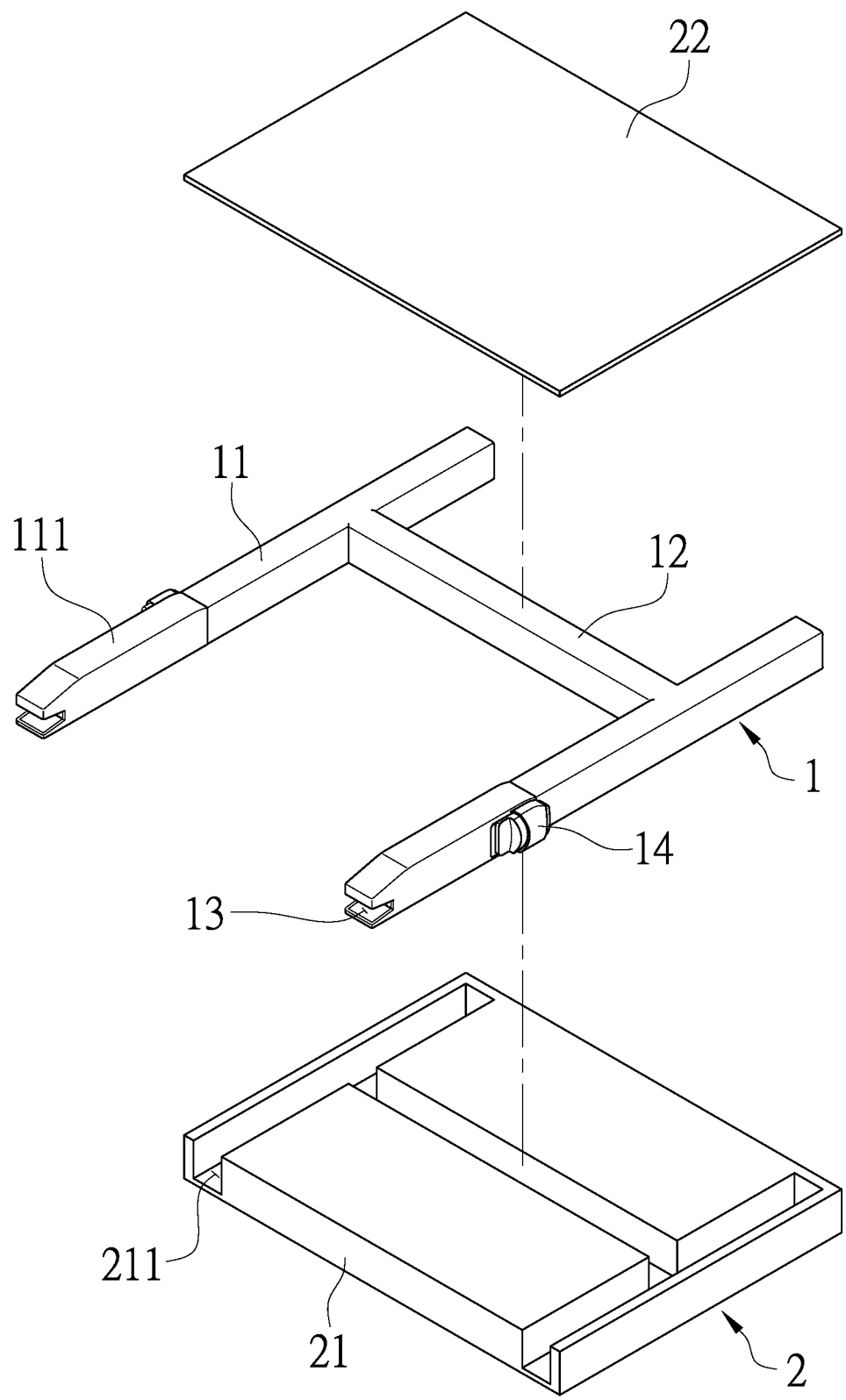
FIG. 1 is an exploded view of an embodiment according to the present invention.
Figure 2:
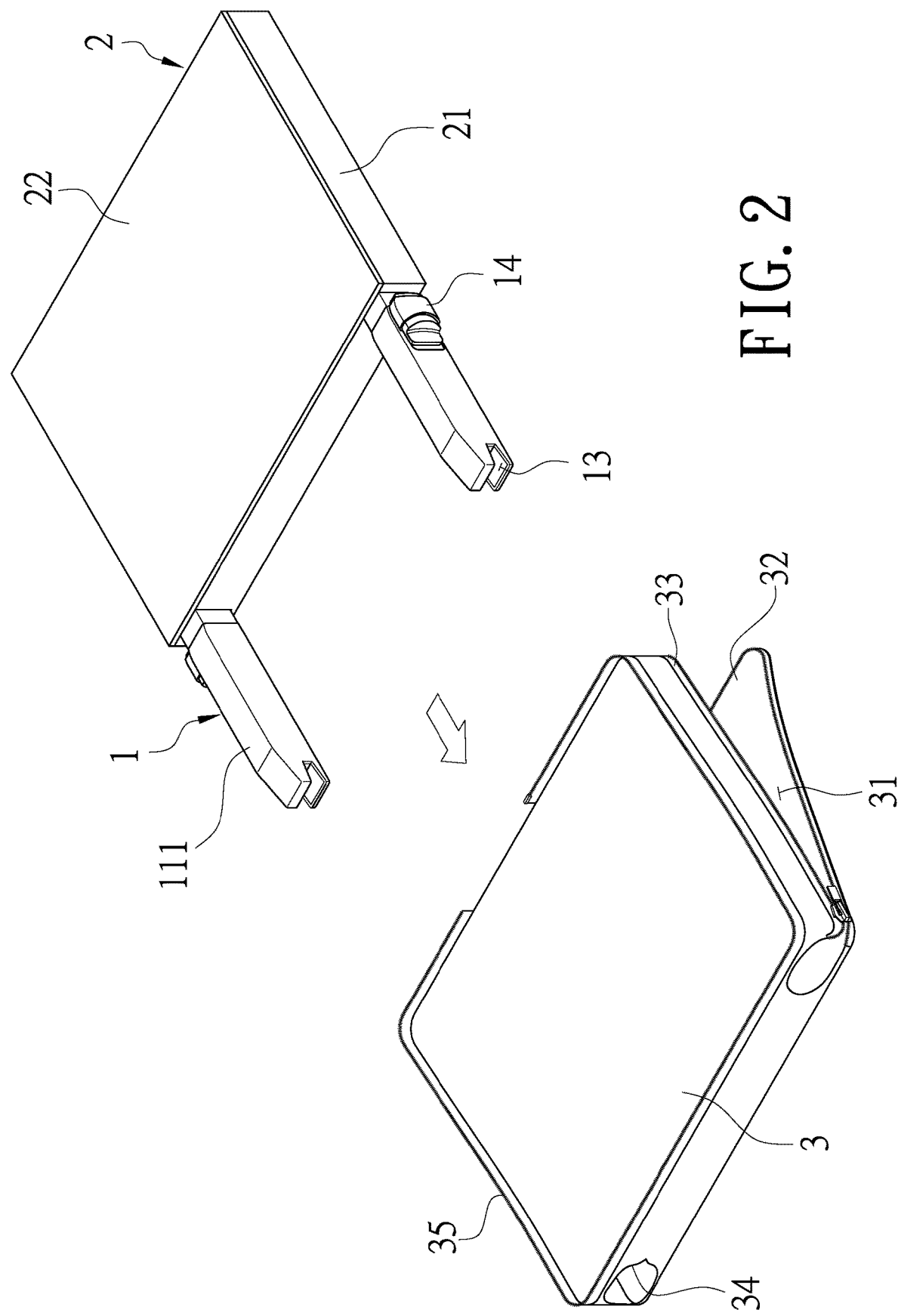
FIG. 2 is another exploded view of an embodiment according to the present invention.
Figure 3:
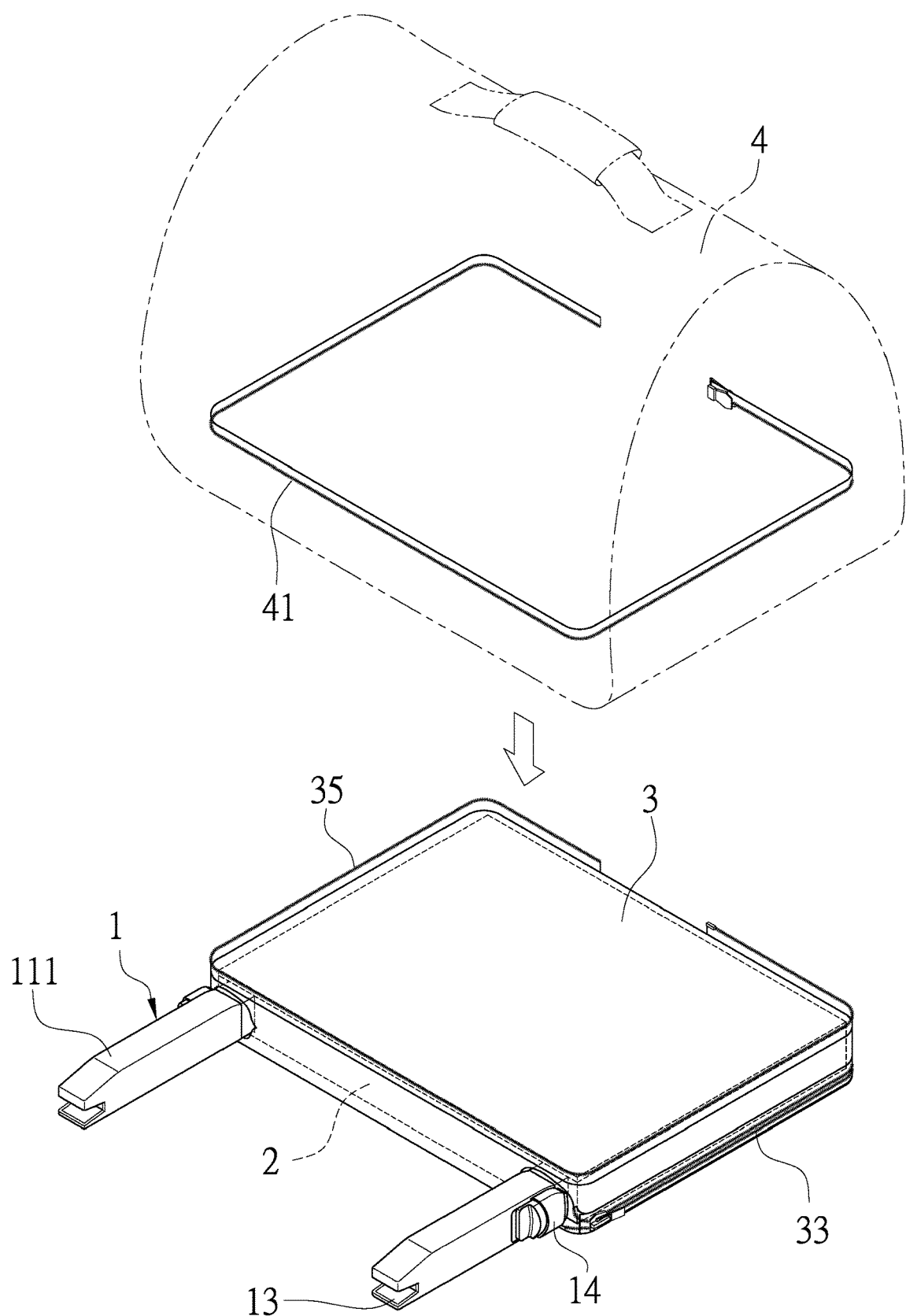
FIG. 3 is a further exploded view of an embodiment according to the present invention.

Refer to FIG. 1, FIG. 2, and FIG. 3, a car safety device for pets mainly includes a fixing frame 1, a seat cushion 2, and a seat cushion cover 3. The fixing frame 1 is provided with at least one support rod 11. In this embodiment, the fixing frame 1 consists of two support rods 11 arranged parallel to each other, a transverse rod 12 located between and connected with the two support rods 11, an anchor member 13 disposed on a working end 111 of each of the support rods 11, and an operating member 14 mounted to a lateral surface of each of the support rods 11 by which the anchor member 13 on the same support rod 11 is linked and actuated for control of on/off of the anchor member 13.

The seat cushion 2 is composed of a pad body 21 and a cover body 22. The pad body 21 is provided with a mounting slot 211 whose shape is corresponding to the fixing frame 1 and having an opening on a top end of the pad body 21 for allowing the fixing frame 1 to be mounted and positioned in the mounting slot 211 of the pad body 21 through the opening on the top end of the pad body 21. The working ends 111 of the two support rods 11 of the fixing frame 1 are protruding from the pad body 21. The cover body 22 is covering the top end of the pad body 21 for closing the opening of the mounting slot 211 of the pad body 21 so that the fixing frame 1 will not come off from the opening of the mounting slot 211. The pad body 21 and the cover body 22 can be made of plastic, polystyrene, rubber, foam materials, or metal such as iron.

The seat cushion cover 3 is provided with a mounting space 31 therein, an opening 32 formed on a part of a periphery thereof, at least one seal member 33 arranged at the opening 32, at least one through hole 34 disposed on the periphery thereof without the opening 32 and communicating with the mounting space 31, and at least one first connecting member 35 disposed around an upper end thereof. The seal member 33 can be a zipper, a hook-and-loop fastener, or a snap fastener having male and female interlocking elements. In this embodiment, there are two through holes 34. The seat cushion 2 mounted with the fixing frame 1 is placed into the mounting space 31 of the seat cushion cover 3 and the working ends 111 of the two support rods 11 of the fixing frame 1 are protruding from the two through holes 34 of the seat cushion cover 3 correspondingly. The first connecting member 35 is connected with or separated from at least one second connecting member 41 arranged around a bottom end of a pet carrier bag 4 correspondingly. The first connecting member 35 and the second connecting member 41 can be zippers, hook-and-loop fasteners, or male and female interlocking elements of a snap fastener.

Figure 4:
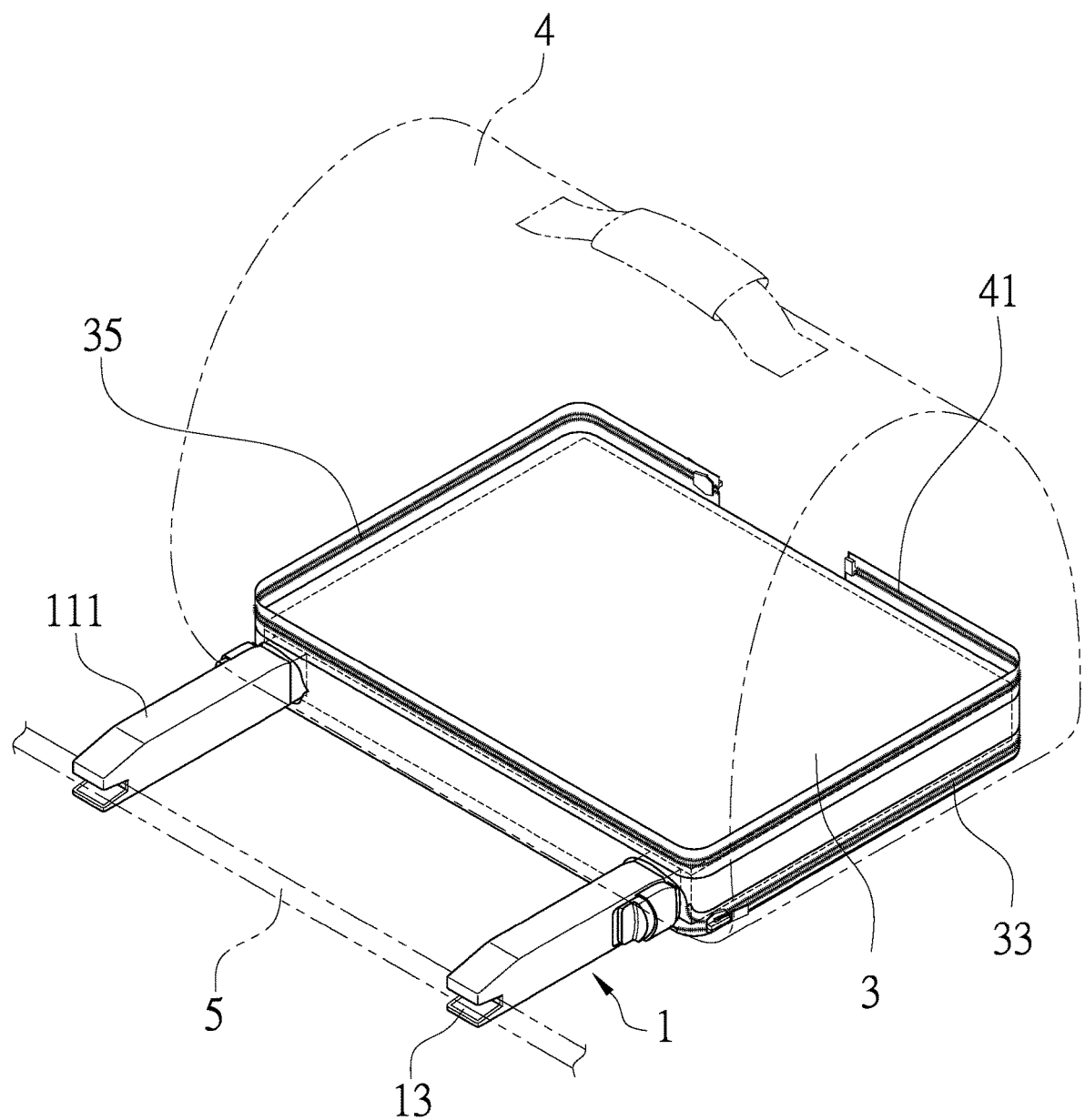
FIG. 4 is a perspective view of an embodiment in use according to the present invention.

When users go out for a drive with their pets, as shown in FIG. 4, the present device is disposed on a car seat and the anchor members 13 on the support rods 11 of the fixing frame 1 are connected and fixed on a support bar 5 arranged between a seat base and a backrest of the car seat to have a tight connection with the car seat. Then the user can place the pet carrier bag 4 with a pet therein on the seat cushion cover 3 and the second connecting member 41 around the bottom end of the pet carrier bag 4 is connected with the first connecting member 35 around the upper end of the seat cushion cover 3 correspondingly. Thus the pet carrier bag 4 is firmly fixed on the present device.

When the user is driving a car on a bump road, making a turn, or braking the car, the pet carrier bag 4 tightly connected with the present device is arranged at the car seat stably due to firm connection between the present device and the car seat, without shaking, sliding, or even falling down from the car seat. Therefore, the pet in the pet carrier bag 4 will not get stressed, scared or injured in an impact and the safety of the pet in the car is significantly improved.

When the user reaches the destination and intends to carry the pet with he/she, the pet carrier bag 4 is separated from the present device by the second connecting member 41 of the pet carrier bag 4 and the first connecting member 35 of the seat cushion cover 3 being disconnected with each other. Thus the pet carrier bag 4 with the pet therein can be taken out of the car conveniently.

In summary, the present car safety device for pets has the following advantages.

1. The present car safety device for pets can be firmly connected with the car seat and then the pet carrier bag is connected with the present device. Thus the pet carrier bag will not be shaking, sliding, or even falling down from the car seat. Therefore, the pet in the pet carrier bag is stably placed on the car seat and the safety of the pet in the car is enhanced.
2. The first connecting member is disposed around the upper end of the seat cushion cover while the second connecting member is arranged around the bottom end of the pet carrier bag for connection with the first connecting member around the upper end of the seat cushion cover correspondingly. Thus the pet carrier bag is fixed and connected with the present car safety device for pets. In order to separate the pet carrier bag from the present car safety device for pets, the first connecting member and the second connecting member are disconnected. Thereby the pet carrier bag is assembled and disassembled with the present car safety device for pets conveniently.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A car safety device for pets comprising a fixing frame, a seat cushion for mounting the fixing frame therein, and a seat cushion cover in which the seat cushion with the fixing frame is mounted; wherein the fixing frame is provided with at least one support rod having a working end; the working end of the support rod of the fixing frame protrudes from both the pad body and the seat cushion cover and an anchor member is arranged at the working end of the support rod; wherein the seat cushion consists of a cover body and a pad body provided with a mounting slot having a shape corresponding to the fixing frame and having an opening on a top end of the pad body for allowing the fixing frame to be mounted and positioned in the mounting slot of the pad body through the opening, and the cover body covers the top end of the pad body for closing the opening of the mounting slot of the pad body; wherein the seat cushion cover is provided with at least one first connecting member which is connected with or separated from at least one second connecting member arranged at a pet carrier bag correspondingly.

2. The car safety device for pets as claimed in claim 1, wherein the seat cushion cover is provided with a mounting space therein, an opening formed on a part of a periphery thereof, at least one seal member arranged at the opening, another part of the periphery of the seat cushion cover devoid of the opening having at least one through hole formed therein and being in open communication with the mounting space; wherein the seat cushion mounted with the fixing frame is placed into the mounting space of the seat cushion cover and the working end of the support rod of the fixing frame is protruding from the through hole of the seat cushion cover.

3. The car safety device for pets as claimed in claim 2, wherein the seal member of the seat cushion cover is selected from the group consisting of a zipper, a hook-and-loop fastener, and a snap fastener having male and female interlocking elements.

4. The car safety device for pets as claimed in claim 1, wherein the first connecting member is disposed around an upper end of the seat cushion cover while the second connecting member is arranged around a bottom end of the pet carrier bag.

5. The car safety device for pets as claimed in claim 1, wherein the first connecting member of the seat cushion cover and the second connecting member of the pet carrier bag are selected from the group consisting of zippers, hook-and-loop fasteners, and male and female interlocking elements of a snap fastener.

6. The car safety device for pets as claimed in claim 1, wherein materials for the pad body and the cover body of the seat cushion are selected from the group consisting of plastic, polystyrene, rubber, foam materials, and metals.

7. The car safety device for pets as claimed in claim 1, wherein an operating member is mounted to the support rod of the fixing frame and the anchor member on the working end of the support rod is linked with and actuated by the operating member.

8. The car safety device for pets as claimed in claim 1, wherein the fixing frame is provided with the two support rods arranged parallel to each other and the working end of each of the two support rods is provided with the anchor member.

9. A car safety device for pets comprising a fixing frame, a seat cushion for mounting the fixing frame therein, and a seat cushion cover in which the seat cushion with the fixing frame is mounted, the seat cushion cover being provided with a mounting space therein, an opening formed on a part of a periphery thereof, at least one seal member arranged at the opening, and another part of the periphery of the seat cushion cover being devoid of the opening and having at least one through hole formed therein and being in open communication with the mounting space; wherein the seat cushion mounted with the fixing frame is placed into the mounting space of the seat cushion cover; wherein the fixing frame is provided with at least one support rod having a working end; the working end of the support rod of the fixing frame protrudes from the through hole of the seat cushion cover and an anchor member is arranged at the working end of the support rod; wherein the seat cushion cover is provided with at least one first connecting member which is connected with or separated from at least one second connecting member arranged at a pet carrier bag correspondingly.

10. The car safety device for pets as claimed in claim 9, wherein the seal member of the seat cushion cover is selected from the group consisting of a zipper, a hook-and-loop fastener, and a snap fastener having male and female interlocking elements.

* * * * *